US012327328B2

(12) United States Patent
Shen et al.

(10) Patent No.: US 12,327,328 B2
(45) Date of Patent: Jun. 10, 2025

(54) AESTHETICS-GUIDED IMAGE ENHANCEMENT

(71) Applicant: ADOBE INC., San Jose, CA (US)

(72) Inventors: Xiaohui Shen, San Jose, CA (US); Zhe Lin, Fremont, CA (US); Xin Lu, Mountain View, CA (US); Sarah Aye Kong, Cupertino, CA (US); I-Ming Pao, Palo Alto, CA (US); Yingcong Chen, Hong Kong (TW)

(73) Assignee: Adobe Inc., San Jose, CA (US)

( * ) Notice: Subject to any disclaimer, the term of this patent is extended or adjusted under 35 U.S.C. 154(b) by 601 days.

(21) Appl. No.: 17/379,622

(22) Filed: Jul. 19, 2021

(65) Prior Publication Data
US 2021/0350504 A1 Nov. 11, 2021

Related U.S. Application Data

(62) Division of application No. 15/928,706, filed on Mar. 22, 2018, now Pat. No. 11,069,030.

(51) Int. Cl.
*G06T 5/00* (2024.01)
*G06V 10/44* (2022.01)
*G06V 10/774* (2022.01)
*G06V 10/82* (2022.01)
(Continued)

(52) U.S. Cl.
CPC ............ *G06T 5/00* (2013.01); *G06V 10/454* (2022.01); *G06V 10/774* (2022.01); *G06V 10/82* (2022.01); *G06V 20/10* (2022.01); *G06V 30/19173* (2022.01); *G06T 2207/20081* (2013.01); *G06T 2207/20084* (2013.01)

(58) Field of Classification Search
None
See application file for complete search history.

(56) References Cited

U.S. PATENT DOCUMENTS

| 6,816,847 B1 * | 11/2004 | Toyama ............... G06T 7/0002 706/14 |
| 10,147,216 B1 * | 12/2018 | Miao ....................... G06T 5/50 |
| 10,540,757 B1 | 1/2020 | Bouhnik et al. |

(Continued)

OTHER PUBLICATIONS

Choe, G.—"RANUS RGB and NIR Urban Scene Dataset for Deep Scene Parsing"—IEEE Robotics—Jan. 2018—pp. 1-8 (Year: 2018).*

(Continued)

*Primary Examiner* — Bernard Krasnic
(74) *Attorney, Agent, or Firm* — Shook, Hardy & Bacon L.L.P.

(57) ABSTRACT

Methods and systems are provided for generating enhanced image. A neural network system is trained where the training includes training a first neural network that generates enhanced images conditioned on content of an image undergoing enhancement and training a second neural network that designates realism of the enhanced images generated by the first neural network. The neural network system is trained by determine loss and accordingly adjusting the appropriate neural network(s). The trained neural network system is used to generate an enhanced aesthetic image from a selected image where the output enhanced aesthetic image has increased aesthetics when compared to the selected image.

15 Claims, 10 Drawing Sheets
(1 of 10 Drawing Sheet(s) Filed in Color)

(51) Int. Cl.
*G06V 20/10* (2022.01)
*G06V 30/19* (2022.01)

(56) References Cited

U.S. PATENT DOCUMENTS

| | | |
|---|---|---|
| 2014/0354768 A1 | 12/2014 | Mei et al. |
| 2017/0294010 A1 | 10/2017 | Shen et al. |
| 2019/0108621 A1* | 4/2019 | Condorovici ............. G06T 5/00 |
| 2019/0147582 A1 | 5/2019 | Lee et al. |
| 2019/0251674 A1 | 8/2019 | Chang et al. |

OTHER PUBLICATIONS

Agrawal, M., and Sawhney, K., "Exploring Convolutional Neural Networks for Automatic Image Colorization", pp. 1-9 (2017).

Cao, Y., et al., "Unsupervised Diverse Colorization via Generative Adversarial Networks", arXiv, pp. 1-16 (Jul. 2017).

Deng, Y., et al., "Aesthetic-Driven Image Enhancement by Adversarial Learning", arXiv:1707.05251, pp. 1-16 (2017).

Fang, H., and Zhang, M., "Creatism: A deep-learning photographer capable of creating professional work", arXiv:1707.03491, pp. 1-14 (2017).

Hensman, P., and Aizawa, K., "cGAN-based Manga Colorization Using a Single Training Image", arXiv:1706.0691, pp. 1-8 (Jun. 2017).

Isola, P., et al., "Image-to-Image Translation with Conditional Adversarial Networks", arXiv:1611.07004, pp. 1-17 (2017).

Johnson, J., et al., "Perceptual Losses for Real-Time Style Transfer and Super-Resolution", In European Conference on Computer Vision, pp. 1-17 (Oct. 2016).

Kong, S., et al., "Photo Aesthetics Ranking Network with Attributes and Content Adaptation", In European Conference on Computer Vision, pp. 1-16 (Oct. 2016).

Zhao, H., et al., "Pyramid scene parsing network", In IEEE Conference on Computer Vision and Pattern Recognition 9 (CVPR), pp. 2881-2890 (Jul. 2017).

* cited by examiner

AESTHETICS-GUIDED IMAGE ENHANCEMENT

CROSS-REFERENCE TO RELATED APPLICATIONS

This application is a Divisional of U.S. patent application Ser. No. 15/928,706 filed Mar. 22, 2018, and titled "Aesthetics-Guided Image Enhancement", the entire contents of which are incorporated by reference herein.

BACKGROUND

Oftentimes, to create an enhanced image, users manually manipulate various aspects of the image. Creating an image that correctly modifies aspects of the image to result in a desired enhanced image, however, is a challenging and tedious task, even for professional artists. For example, currently, a user can individually modify various aspects of an image in an effort to aesthetically enhance an image. Modifying each aspect can be time consuming and may not accurately reflect a desired image.

SUMMARY

Embodiments of the present disclosure are directed towards a system trained to generate images with enhanced aesthetics. One method available for creating such a system is using a neural network. Neural networks can be trained to assist in converting an image into an image with enhanced aesthetics. The quality of an enhanced image generated by a neural network system depends upon how the system is trained and what data it receives during training. To create a neural network system that is trained to generate enhanced images, the system can be trained to be conditioned on the content of images input into the system. Such a system can be comprised of multiple neural networks.

Training of such a neural network system can be accomplished using aesthetic enhancement neural network and an adversarial neural network. First, the aesthetic enhancement neural network is trained by inputting an input image along with a corresponding segmentation map to generate a training enhanced image conditioned on the content of the input image. A neural network system using a segmentation map ensures that the system will take into account the content of different portions of an image (e.g., the same color red will not be modified in the same manner when one red area is designated as a lobster and another red area as a rose). Differences between the training enhanced image and the input image are used to determined errors in the aesthetic enhancement neural network. Such errors can be used to improve the aesthetic enhancement neural network by backwards propagation of the errors through the network.

Reference images can be used to train an adversarial neural network to distinguish "real" from "fake" images. In embodiments, this training is accomplished by inputting a reference image into the adversarial neural network for the network to designate the realism of the reference image (e.g., using a binary designation). Errors can be used to improve the adversarial neural network by backwards propagation of the errors through the network.

In this way, the enhanced images conditioned based on content that are generated by the aesthetic enhancement neural network can be evaluated for realism by the adversarial neural network. Upon completion of training the system, the enhanced images generated by the system will have increased aesthetics while also appearing to be a realistic image (e.g., a real photograph).

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1A:
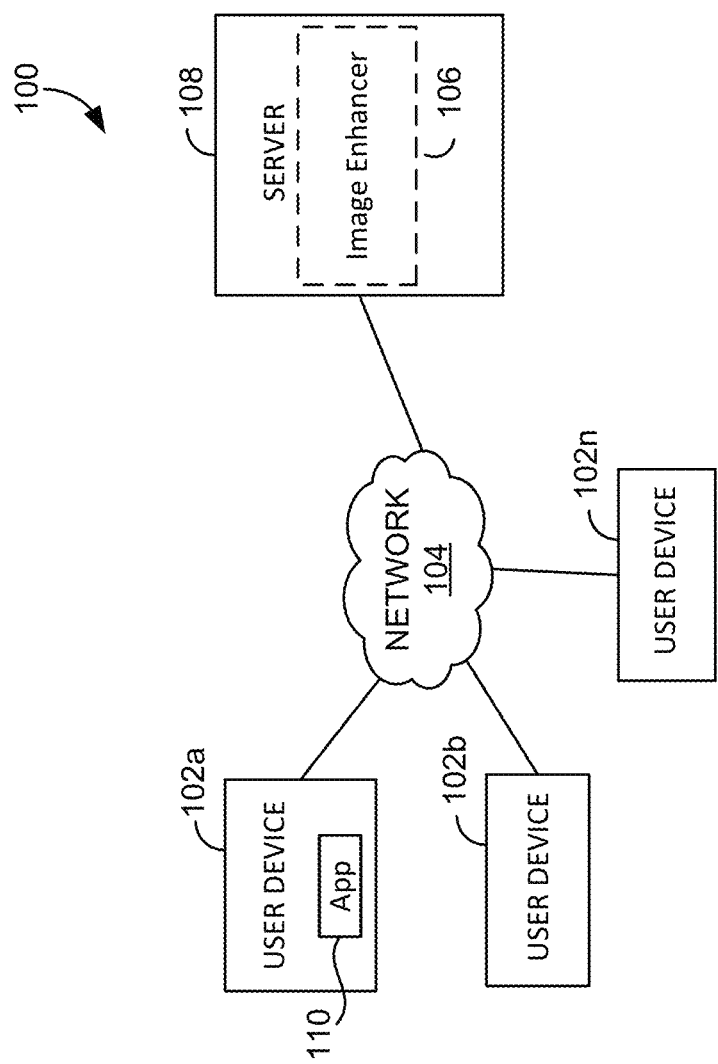
FIG. 1A depicts an example configuration of an operating environment in which some implementations of the present disclosure can be employed, in accordance with various embodiments.

Oftentimes, users desire to easily enhance the aesthetics of images. However, increasing the aesthetics of an image often requires modifying varying aspects of the image (e.g., adjusting lighting, color, focus, composition, etc.). As such, a user may manually edit individual aspects of an image. The resulting image, however, is often unsatisfactory to the user, as a novice user does not have the training, or eye, to edit the image in a manner that results in increased aesthetics. In this regard, such a conventional approach inadequately modifies an image to achieve the desired result of an aesthetically enhanced image. As such, generating an image with enhanced aesthetics is a difficult and tedious task, even for professional artists.

To reduce the amount of manual time and effort spent to enhance the aesthetics of an image, techniques have been developed in an attempt to overcome such limitations of manual edits by a user. Yet, such methods are limited in application. Some techniques attempt to enhance images by merely applying predefined operations, such as color mapping an image or applying a selected filter to an image. Such predefined operations fail to take into account the content of an image (e.g., a dark red color will always be mapped to bright red, regardless of the content of the image). As such, resulting images can include images with altered colors that fail to enhance the aesthetics of the image. As another example, another technique include applying a predefined operation that performs image cropping. However, such techniques typically require supervised input regarding the operation and parameters in order to function correctly and even when functioning correctly, do not produce images modified to increase aesthetics while maintaining realism of the image.

Accordingly, embodiments of the present disclosure are directed to facilitating automated content-adaptive, aesthetics-guided image enhancement. In this regard, an image generated or provided (e.g., a picture taken by a user) can be transformed or converted into an image with enhanced aesthetics. At a high-level, upon input of an image, the image can be converted into an enhanced image using a neural network system. Specifically, the image can be enhanced using a trained neural network(s). Advantageously, the neutral network system can be comprised of one or more neural networks, trained in an unsupervised manner not requiring paired data. In implementations, to enhance the aesthetics of an image, such a trained neural network system can be used to generate an enhanced image from an image where adjustments are content-adaptive.

A neural network generally refers to a computational approach using large clusters of connected neurons. Neural networks are self-learning and trained rather than explicitly programmed so that a generated output reflects a desired result. As described herein, a neural network system can utilize a generative adversarial type architecture. A generative adversarial framework can comprise a generator, such as an aesthetic enhancement neural network, and a discriminator, such as an adversarial neural network. In this way, the generator portion of the system can be the aesthetic enhancement neural network that generates enhanced images conditioned on content from an input (e.g., input image and corresponding segmentation map), and the discriminator portion can be the adversarial neural network that evaluates images for realism or authenticity (e.g., the discriminator decides whether an image is "real" or "fake").

Training such a neural network system can use input images (e.g., designated based on the image falling within a range of imaged with moderate aesthetic scores), reference images (e.g., designated based on the image having a high aesthetic score above a predefined threshold), and segmentation maps corresponding to the images (e.g., to ensure the system is conditioned on image content). Various methods can be used to generate and/or select images used to train the neural network system. For example, a pretrained neural network can be used to assign aesthetic scores to a large database of images. Upon assigning scores to the images, input and references can be selected based on assigned scores.

Input images can be run through an aesthetic enhancement neural network, along with a segmentation map of the input image, to generate enhanced images. Errors in the output enhanced image generated by the aesthetic enhancement network can be determined such that the errors can be fed back through the network to appropriately train the system. For instance, errors can be fed back through the network by adjusting the weight of network connections to reduce the value of the error. In this way, the network architecture remains the same but the weights of the network connections are retrained during each iteration of training to reduce errors. Additionally, training images can be run through an adversarial neural network, along with the segmentation mask to determine the realism of the output images to train the network to recognize "real" images from "fake" images. Generally, "real" images can be defined as images that are realistic and have a high aesthetic attribute score (e.g., above a threshold and/or receive a binary score of 1) and "fake" images can be defined as images that are not realistic and do not have a high aesthetic attribute score (e.g., below a threshold and/or receive a binary score of 0).

The process of training the system can be repeated for a sufficiently large number of cycles, until the neural network system converges to a state where the error of the calculations is small enough such that the output produced reaches a desired threshold minimum of loss between input images and output images. Further, or alternatively, training can continue until the adversarial network can no longer determine that generated output enhanced images differ from real images (e.g., images with high aesthetics that are not generated by the neural network system). During such training, the aesthetic enhancement neural network and adversarial neural network can be updated in an alternating manner. However, as can be appreciated, training the aesthetic enhancement neural network and the adversarial neural network may occur sequentially, concurrently, and/or individually.

Training a neural network system to enhance the aesthetics of an image, as described herein, allows for automatic and non-parametric applications (e.g., enhancement operations are not required to be performed based on specifically determined and defined parameters of an image) when enhancing images. To this end, during the training process, the neural network system learns to take into account context/content of various portions of an image by conditioning input images using a corresponding segmentation map of the input image. Training in this manner ensures that the neural network system recognizes the context of portions of an image (e.g., sky, grass, skin, etc.). As such, fewer artifacts are generated and accuracy of the image is preserved during the enhancement process. Additionally, training in this manner is unsupervised and does not require paired data for training. Conventional neural networks typically require a ground-truth paired image (e.g., what the desired output by the network should look like) for images used to train the network. These ground-truth images are used to train the network to generate outputs close to a desired look. Obtaining the number of such ground-truth images to adequately train a network is time-intensive and tedious. The present disclosure is advantageous in that the input image and paired ground-truth image used to train the aesthetic enhancement neural network are the same.

FIG. 1 depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 9.

It should be understood that operating environment 100 shown in FIG. 1 is an example of one suitable operating environment. Among other components not shown, operating environment 100 includes a number of user devices, such as user devices 102a and 102b through 102n, network 104, and server(s) 108. Each of the components shown in FIG. 1 may be implemented via any type of computing device, such as one or more of computing device 900 described in connection to FIG. 9, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 9. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 in carrying out enhancing the aesthetics of an image. In some implementations, the application(s) comprises a web application, which can run in a web browser, and could be hosted at least partially on the server-side of environment 100. In addition, or instead, the application(s) can comprise a dedicated application, such as an application having image processing functionality. In some cases, the application is integrated into the operating system (e.g., as a service). It is therefore contemplated herein that "application" be interpreted broadly.

In accordance with embodiments herein, the application 110 can facilitate enhancing the aesthetics of an input image. In particular, a user can select or input an image via a graphical user interface (GUI) (e.g., using ADOBE LIGHTROOM, ADOBE PHOTOSHOP, and/or ADOBE PHOTOSHOP EXPRESS). An image can be selected or input in any manner. For example, a user may take a picture using a camera function on a device. As another example, a user may select a desired image from a repository, for example, stored in a data store accessible by a network or stored locally at the user device 102a. Based on the input image, an enhanced image can be generated and provided to the user via the user device 102a. In this regard, the enhanced image can be displayed via a display screen of the user device. Such an enhanced image can be further manipulated and or edited by a user via a GUI on a user device.

As described herein, server 108 can facilitate enhancing the aesthetics of an image via image enhancer 106. Server 108 includes one or more processors, and one or more computer-readable media. The computer-readable media includes computer-readable instructions executable by the one or more processors. The instructions may optionally implement one or more components of image enhancer 106, described in additional detail below.

Image enhancer 106 can train and operate a neural network system in order to enhance the aesthetics of an image. Such a neural network system can include one or more neural networks trained to generate an output. For example, a neural network system can include a first neural network (e.g., an aesthetic enhancement neural network) that generates images with enhanced aesthetic and a second neural network (e.g., an adversarial neural network) that discriminates the realism and/or accuracy of the images generated by the first neural network. Further, when training or operating the first neural network, the image input is conditioned using a corresponding segmentation map. Incorporating a segmentation map during training of the neural network system ensures the system learns adaptive adjustments dependent on the categorization/content of that location of an image (e.g., sky is not green, skin is not purple, etc.). The second neural network can discriminate the output of the first neural network during training using highly scored aesthetic images along with corresponding segmentation maps to learn "real" images from "fake" images.

Such a neural network system can also include neural networks trained to generate segmentation maps for images designating content type for areas of the image (e.g., sky, water, person, blanket, etc.). Further, the neural network systems can include neural networks trained to assign scores to images based on aesthetic attributes of the images (e.g., on a scale of 0 to 1, where 0.1 is an image with poor aesthetic characteristics and a 0.9 image has high aesthetic characteristics).

Continuing with FIG. 1, at a high level, image enhancer 106 can train a neural network system, including an aesthetic enhancement neural network and an adversarial neural network. To train the neural network system, images can be selected using an aesthetic attribute prediction network that assigns aesthetic attribute scores.

To train the aesthetic enhancement neural network, input images can be selected using aesthetic attribute scores within a predefined range determined by the aesthetic attribute prediction network. Utilizing such a range of aesthetic attribute scores can ensure that the input images used to train the aesthetic enhancement neural network are not too poor in quality (e.g., due to camera shake, blur, image darkness) but are also not too high in quality that the aesthetic enhancement neural network fails to learn to enhance images. For example, input images can be designated as having an aesthetic attribute scores between the range of 0.3 and 0.7. In other embodiments, this range can be wider or narrower (e.g., 0.2 to 0.8 or 0.4 to 0.6).

During training of the aesthetic enhancement neural network, a segmentation map of the input image can be fed into the network along with the input image. A segmentation map can generally refer to an image parsed to map the image content for each pixel in the image (e.g., water, sky, building, etc.). Training the aesthetic enhancement neural network to learn to take into account context of various portions of an image ensures that the neural network system recognizes the context of portions of an image, and, as such, fewer artifacts are generated and accuracy of the image is preserved during the enhancement process.

Such an aesthetic enhancement neural network can produce output enhanced images. An output enhanced image can generally refer to an image generated via the aesthetic enhancement neural network from an image. During the training process, an output enhanced image can be compared to the input to facilitate training of the aesthetic enhancement neural network. For example, in embodiments, the input image, along with the corresponding segmentation map, can be used as ground-truth for training purposes to compare with the output enhanced image, along with the corresponding segmentation map. In this regard, the aesthetic enhancement neural network can be modified or adjusted based on the comparison such that the quality of subsequently generated enhanced images increases. Such training helps to increase the aesthetics of an image during the enhancement.

To train the adversarial neural network, training images above a predefined threshold of aesthetic attribute scores can be selected using the aesthetic attribute prediction network (e.g., above a score of 0.7). In other embodiments, this threshold can be higher or lower (e.g., 0.8 or 0.6). Utilizing such a threshold of aesthetic attribute scores can ensure that the training images are high in quality such that the adversarial neural network can learn to distinguish between "real" and "fake" images. "Real" images can be generally defined as images that are realistic and have a high aesthetic attribute score. "Fake" images can generally be defined as images that are not realistic and do not have a high aesthetic attribute score (e.g., due to camera shake, blur, image darkness). In this way, when the aesthetic enhancement neural network outputs an enhanced image, the adversarial neural network can indicate whether the enhanced image is "real" or "fake."

In various implementations, an image aesthetic enhancing neural network system comprised of an aesthetic enhancement neural network and an adversarial neural network of image enhancer 106 can be iteratively trained. In iterations, multiple input images can be used to generate output enhanced images and training images can be used to output "real" or "fake" determinations.

Such a neural network system can be classified as a generative adversarial neural network system in that the system simultaneously learns loss while classifying output images as "real" or "fake." For instance, in iterations, image enhancer 106 can select an image to aesthetically enhance. Image enhancer 106 can use an aesthetic enhancement neural network to generate an enhanced image. Errors in the enhanced image can be determined and fed back through the aesthetic enhancement neural network so the weight of network connections can be adjusted in order to reduce the value of the error(s). In this way, the aesthetic enhancement neural network can be continually updated to generate enhanced images that appear realistic. Image enhancer 106 can also use an adversarial neural network to detect whether the enhanced images generated by the aesthetic enhancement neural network are "real" or "fake." The adversarial neural network can be trained to learn this distinction using reference images. In embodiments, as the neural network system is trained, the aesthetic enhancement neural network and the adversarial neural network can be updated alternatively.

Upon completion of training the neural network system of image enhancer 106, the adversarial neural network can be removed from the system and/or deactivated. Training of the system can be deemed completed upon a determination that the values of errors are below a predefined threshold (e.g., loss value is minimal). Such as determination can also, or exclusively, be based on the adversarial neural network indicating that all generated enhanced images for a predefined number of training cycles are "real."

For cloud-based implementations, the instructions on server 108 may implement one or more components of image enhancer 106, and application 110 may be utilized by a user to interface with the functionality implemented on server(s) 108. In some cases, application 110 comprises a web browser. In other cases, server 108 may not be required. For example, the components of image enhancer 106 may be implemented completely on a user device, such as user device 102a. In this case, image enhancer 106 may be embodied at least partially by the instructions corresponding to application 110.

Thus, it should be appreciated that image enhancer 106 may be provided via multiple devices arranged in a distributed environment that collectively provide the functionality described herein. Additionally, other components not shown may also be included within the distributed environment. In addition, or instead, image enhancer 106 can be integrated, at least partially, into a user device, such as user device 102a. Furthermore, image enhancer 106 may at least partially be embodied as a cloud computing service.

Figure 1B:
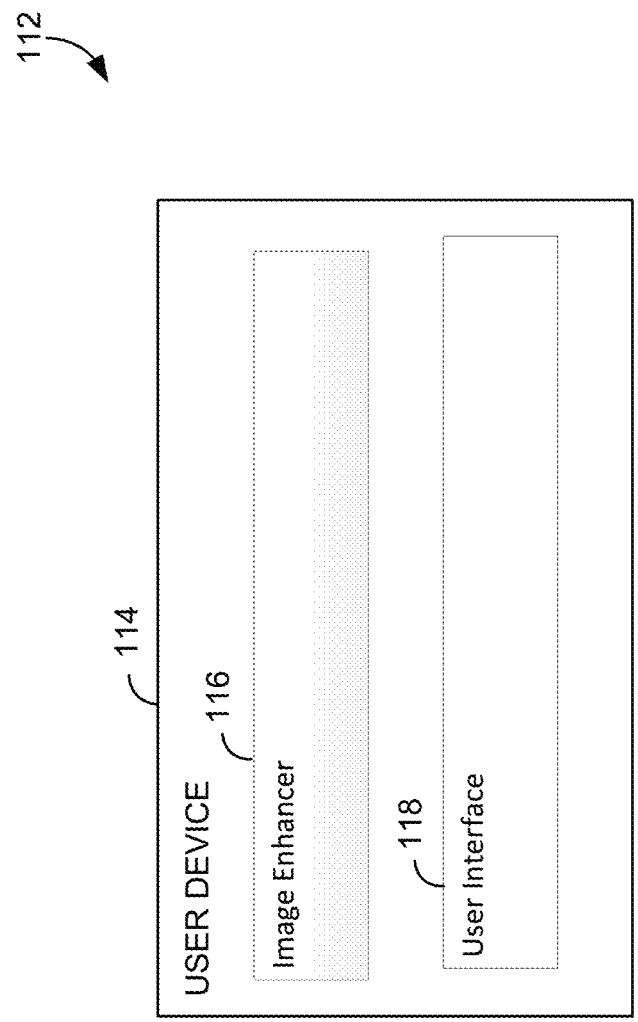
FIG. 1B depicts an example configuration of an operating environment in which some implementations of the present disclosure can be employed, in accordance with various embodiments.

Referring to FIG. 1B, aspects of an illustrative aesthetic image enhancing neural network system are shown, in accordance with various embodiments of the present disclosure. FIG. 1B depicts a user device 114, in accordance with an example embodiment, configured to allow for enhancing the aesthetics of an image. The user device 114 may be the same or similar to the user device 102a-102n and may be configured to support the image enhancer 116 (as a stand-alone or networked device). For example, the user device 114 may store and execute software/instructions to facilitate interactions between a user and the image enhancer 116 via the user interface 118 of the user device.

A user device can be utilized by a user to facilitate enhancing the aesthetics of an image. In particular, a user can select and/or input an image to enhance utilizing user interface 118. An image can be selected or input in any manner. The user interface may facilitate the user accessing one or more stored images on the user device (e.g., in a photo library), and/or import images from remote devices and/or applications. Based on the selected image, image enhancer 116 can be used to increase the aesthetics of the image using various techniques, some of which are further discussed below. User device 114 can also be utilized for displaying an enhanced image.

Figure 2:
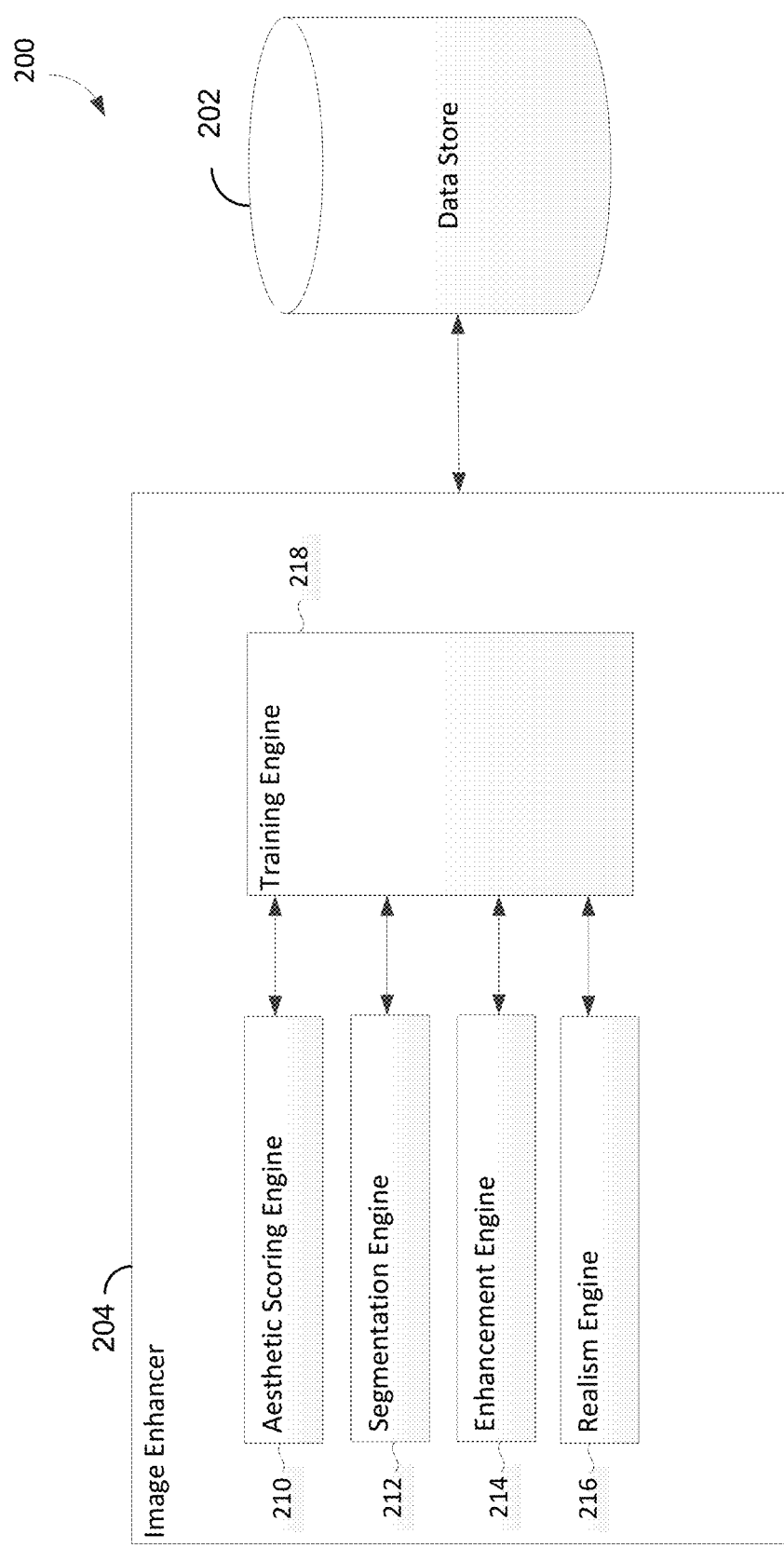
FIG. 2 depicts an example configuration of an operating environment in which some implementations of the present disclosure can be employed, in accordance with various embodiments of the present disclosure.

Referring to FIG. 2, aspects of an illustrative image enhancing environment 200 are shown, in accordance with various embodiments of the present disclosure. Image enhancer 204 includes aesthetic scoring engine 210, segmentation engine 212, enhancement engine 214, realism engine 216, and training engine 218. The foregoing engines of image enhancer 204 can be implemented, for example, in operating environment 100 of FIG. 1A and/or operating environment 112 of FIG. 1B. In particular, those engines may be integrated into any suitable combination of user devices 102a and 102b through 102n and server(s) 106 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the image enhancer.

As shown, an image enhancing system can operate in conjunction with data store 202. Data store 202 can store computer instructions (e.g., software program instructions, routines, or services), data, and/or models used in embodiments described herein. In some implementations, data store 202 can store information or data received via the various engines and/or components of image enhancer 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally). In embodiments, data stored in data store 202 can include images used for training a neural network system. Such images can be input into data store 202 from a remote device, such as from a server or a user device.

In embodiments, data stored in data store 202 can include training data. Training data generally refers to data used to train a neural network system, or portion thereof. As such, training data can include input images, reference images, generated output images, and/or segmentation maps. In some cases, data can be received by image enhancer 204 from user devices (e.g., an input image received by user device 202a or another device associated with a user, via, for example, application 210). In other cases, data can be received from one or more data stores in the cloud.

Data store 202 can also be used to store a neural network system during training and/or upon completion of training. Such a neural network system can be comprised of one or more neural networks, such as an aesthetic enhancement neural network and an adversarial neural network. Other neural network systems that can be stored in data store 202 can include an aesthetic scoring system and/or an image segmentation system.

Image enhancer 204 can generally be used for enhancing the aesthetics of images. Specifically, the image enhancer can be trained to generate images with enhanced aesthetics, as when compared to an image input into the image enhancer. In accordance with embodiments described herein, the image enhancer can be run using, for example, a generative adversarial framework. Such a framework can be comprised of an aesthetic enhancement neural network (e.g., a generator) and an adversarial neural network (e.g., a discriminator).

As used herein, the aesthetic enhancement neural network can utilize a neural network with a U-Net encoder-decoder architecture. Terminology generally used to describe aspects of such a neural network can include the following: Ck can denote a Covolution-BatchNorm-ReLU layer with k filters and CDk can denote a Convolution-BatchNorm-Dropout-ReLU layer with a dropout rate of 50%. Such convolutions can be 4×4 spatial filters applied with stride 2. Convolutions in the encoder can down-sample by a factor of 2 and the decoder can up-sample by a factor of 2. For instance, the encoder can be comprised of layers: C64-C128-C265-C512-C512-C512-C512-C512, and the decoder can be comprised of layers: CD512-CD1024-CD1024-C1024-c1024-C512-C256-C128. A U-Net can have skip connections between each layer i in the encoder and layer n-i in the decoder, where n is the total number of layers. The skip connections concatenate activations from layer i to n-i. After the last layer in the decoder, a convolution can be applied to map to the number of channels (e.g., 4 channels—Red, Green, Blue, and Segment Map), followed by a Tanh function.

As used herein, the adversarial neural network can utilize a fully convolutional neural network. For instance the network can be a 70×70 discriminator comprised of layers: C64-C128-C256-C512. Other discriminators can also be used, where depth is varied to modify the receptive field size (e.g., 1×1 discriminator, 16×16 discriminator, 286×286 discriminator). After the final layer of the adversarial neural network, a convolution can be applied to map to a one dimensional output followed by a Signoid function.

In this way, the neural network system can function where the aesthetic enhancement neural network tries to produce realistic outputs (e.g., "real" images) that convince the adversarial neural network of being "real." At the same time, the adversarial neural network is trained to try to detect "fakes" generated by the aesthetic enhancement neural network.

Training engine 218 can be used to train a neural network system, such as a system used to enhance the aesthetics of an image. As depicted in FIG. 2, training engine 218 can interact with aesthetic scoring engine 210, segmentation engine 212, enhancement engine 214, and realism engine 216 during the training of an image enhancing neural network system.

Aesthetic scoring engine 210 can be used to score aesthetics of images. Images can be taken from a large dataset of image (e.g., FLCKR). To score the aesthetics of an image, various methods can be utilized. One method of scoring can estimate an overall aesthetic score for an image using an aesthetic attribute prediction network. Such an aesthetic attribute prediction network can be trained to automatically assign aesthetic scores to images based on various aesthetic attributes. The aesthetic score can be an overall aesthetic score based on multiple attributes or the aesthetic score can be based on a single or selected group of attributes. Images for scoring can be obtained from various sources. In one embodiment, the methods described in application Ser. No. 15/097,113, UTILIZING DEEP LEARNING FOR RATING AESTHETICS OF DIGITAL IMAGES, can be utilized to assign aesthetic scores to images.

Scored images from aesthetic scoring engine 210 can be used as a dataset for training an aesthetic image enhancing neural network system. Specifically, images can be used as input images for training an aesthetic enhancement neural network and reference images for training an adversarial neural network of such a system. A scored dataset of images can be stored, for example, using data store 202.

Segmentation engine 212 can be used to parse the content of images to generate segmentation maps. Parsed images can include images categorized as input images and images categorized as reference images. In embodiments, image parsing can occur based on image segmentations. For example, a segmentation map of an image can be generated using a pyramid parsing network (e.g., PSPNet). Such a pyramid parsing network can take an image and generate a map of the image content for each pixel of the image. In an embodiment, image content can be encoded using grayscale (e.g., water=1, sky=2, building=3, etc.). Upon completing segmentation of an image based on content, segmentation engine 212 can reduce the categories of the content. Such reduction of content categories can ensure that there are less than 255 content categories so the segmentation maps can be coded using 8 bit grayscale.

Segmentation maps generated by segmentation engine 212 can be input into the aesthetic image enhancing neural network system, for instance, into the aesthetic enhancement neural network and the adversarial neural network. In this way, there are four input channels into the system instead of three channels (e.g., RGB input image and grayscale segmentation map). Utilizing such a segmentation map during training of the neural network system ensures the system learns adaptive adjustments dependent on the categorization/content of portions of an image (e.g., sky is not green, skin is not purple, etc.). As such, training the neural networks of the system to be dependent on image content allows for the system to understand and/or generate accurate colors during enhancement of an image.

Training engine 218 can run the training of an aesthetic image enhancing neural network system. Such a system can be comprised of an aesthetic enhancement neural network and an adversarial neural network. An aesthetic enhancement neural network can be a conditional generator run using, for example, enhancement engine 214. An adversarial neural network can be a discriminator run using, for example, realism engine 216.

Training engine 218 can select an input image for training an aesthetic enhancement neural network of an aesthetic image enhancing neural network system. In embodiments, enhancement engine 214 can run the aesthetic enhancement neural network within the system. An input image can be selected, for example, from data store 202. An input image can be an image previously scored by an aesthetic attribute prediction network (e.g., using aesthetics scoring engine 210). The aesthetic enhancement neural network can transform the input image into an enhanced image. This can be accomplished, for example, by using a U-Net encoder-decoder with skip connections between mirrored layers in the encoder and decoder stacks to downsample the input image to a lower dimension, perform a sequence of transformations to generate an enhanced image, and then upsample the enhanced image to a desired output size. The objective of such an aesthetic enhancement neural network can be to generate images that appear "real."

To accomplish this goal, the aesthetic enhancement neural network can be trained to learn a conditional generative model based on an input image conditioned by a corresponding segmentation map of the input image. This conditional generative model can be learned by evaluating differences between the input image and the generated enhanced image conditioned on content (e.g., using a segmentation map of the image). For instance, the aesthetic enhancement neural network can be trained to minimize loss. In embodiments, this loss can comprise content loss.

Content loss can include errors, inaccuracies, flaws, variations, and/or divergences between the generated enhanced image and the input image, where the input image is used as a type of ground-truth. Using content loss to train the aesthetic enhancement neural network is advantageous because the network is not being trained to change the content of the input image, but to enhance the image (e.g., change color, saturation, etc.). As such, content loss can be used to maintain the content/structure and/or texture of the original input image in the generated enhanced image. In an embodiment, content loss can be composed of two types of loss: Euclidean loss and perceptual loss.

First, Euclidean loss can be evaluated. Euclidean loss can be determined by comparing the original red/green/blue ("RGB") input image and the generated enhanced image, using the original RGB input image as ground-truth to calculate pixel-wise loss between the two images. As the aesthetic enhancement neural network is being trained to enhance images, the pixels of the enhanced image should remain relatively close to the RGB colors of the input image (e.g., a dark red pixel of the input image is enhanced to a slightly brighter red pixel in the generated enhanced image). However, if only Euclidean loss is minimized, the aesthetic enhancement neural network will be trained to generate images identical to the input images. As such, perceptual loss can also be evaluated to prevent this outcome.

Perceptual loss can be used to maintain features between the input and generated images. As such, perceptual loss is advantageous in that the content shown in the input and generated images will be highly similar/the same and texture, edges, and layers of the input images will be maintained in the generated enhanced images. Perceptual loss can be dependent on variances based on content in the images. For instance, perceptual loss can be determined by comparing content of the input image and features of the generated enhanced image using a segmentation map. Such content can be distinct portions and/or objects of the input image and the generated enhanced image. For example, when the image is a portrait of a person, content can include one or both eyes, a mouth, and/or a nose of the person; when the image is a landscape, features could include one or more trees and/or a horizon line from the landscape; when the image is a bedroom scene, features can include a bed, a lamp, and/or a corner of a room. Errors determined can be used to minimize loss in the network through backwards propagation of such errors.

Adjusting the network can be accomplished by changing at least one node parameter of the aesthetic enhancement neural network. The aesthetic enhancement neural network can comprise a plurality of interconnected nodes with a parameter, or weight, associated with each node. While individual parameters do not have to be specified during training of a neural network, examples of such parameters can include edge detection, RGB color, textures of features, roughness, and/or blur of an image. Each node can receive inputs from multiple other nodes and can activate based on the combination of all these inputs, for example, when the sum of the input signals is above a threshold. The parameter can amplify or dampen the input signals. For example, a parameter could be a value between 0 and 1. The inputs from each node can be weighted by a parameter, or in other words, multiplied by the parameter, prior to being summed. In this way, the parameters can control the strength of the connection between each node and the subsequent node. For example, for a given node, a first parameter can provide more weight to an input from a first node, while a second parameter can provide less weight to an input from a second node. As a result, the parameters strengthen the connection to the first node, making it more likely that a signal from the first node will cause the given node to activate, while it becomes less likely that inputs from the second node will cause activation.

Training engine 218 can further select a reference image for training an adversarial neural network of an aesthetic image enhancing neural network system. In embodiments, realism engine 216 can run the adversarial neural network within the neural network system. A reference image can be selected, for example, from data store 202. A reference image can be an image previously scored by an aesthetic attribute prediction network (e.g., using aesthetics scoring engine 210). The adversarial neural network can learn whether an image is "real" using reference images. This can be accomplished, for example, by using a fully convolutional network to determine adversarial loss.

Adversarial loss can be determined by whether the generated enhanced image looks realistic. This can be accomplished by assigning a binary classification of 0 or 1 based on a comparison between reference images and the generated enhanced image. Zero can mean the generated enhanced image does not look realistic, and one can mean the generated enhanced image looks realistic. Such an analysis can be performed by training a neural network to determine such differences. Errors determined using adversarial loss are then applied to the image neural network through backwards propagation of such errors. Upon training the neural network system for adversarial loss, the network focuses on generating more realistic results with plausible color and change deviations from the reference image rather than putting emphasis on exactly reproducing the reference image.

In embodiments training engine 218 can determine losses for both the aesthetic enhancement neural network running using enhancement engine 214 and the adversarial neural network running using realism engine 216. Such loss can result in a final objective function $L=L_{content}(x_{in}, G(x_{in} \oplus s_{in}))+L_{adversarial}(D(G(x_{in} \oplus s_{in}) \oplus s_{in}), D(x_{ref} \oplus s_{ref}))$. Where L represents loss function used to weight parameters of the system. $L_{content}$ represents content loss. $L_{adversarial}$ represents adversarial loss. An example formula to calculate adversarial loss is $L_{adversarial}(x, y)=\log(y)+\log(1-x)$ where $x=D(G(x_{in} \oplus s_{in}))$ and $y=D(x_{ref} \oplus s_{ref})$.

In execution, an aesthetic image enhancing neural network system, trained according to the present disclosure, can be used to enhance input images. Such enhancement can be performed using enhancement engine 214. As can be appreciated, a trained neural network system, such as a trained aesthetic image enhancing neural network system (e.g., comprised of an aesthetic enhancement neural network and an adversarial neural network as described above), can be used by the enhancement engine to perform image enhancement. The method of enhancing images can be similar to the process described for training the neural network system, however, in execution, realism engine 216 can cease evaluating the realism of the enhanced image output by the aesthetic enhancement neural network.

Upon completion of training, enhancement engine 214 can receive an input image (e.g., from a user at a user device). The image can be selected for input using techniques including a touch screen, a stylus, a mouse, and/or a track pad. In other embodiments, a user can input the image by inputting a link or URL to an image. Alternatively, a user can select an image from a group of images stored in a database, such as data store 202.

An aesthetic image enhancing neural network system can then be used to enhance the selected image. The generated enhanced image will maintain features of the input image while enhancing the overall aesthetics of the selected image.

Figure 3:
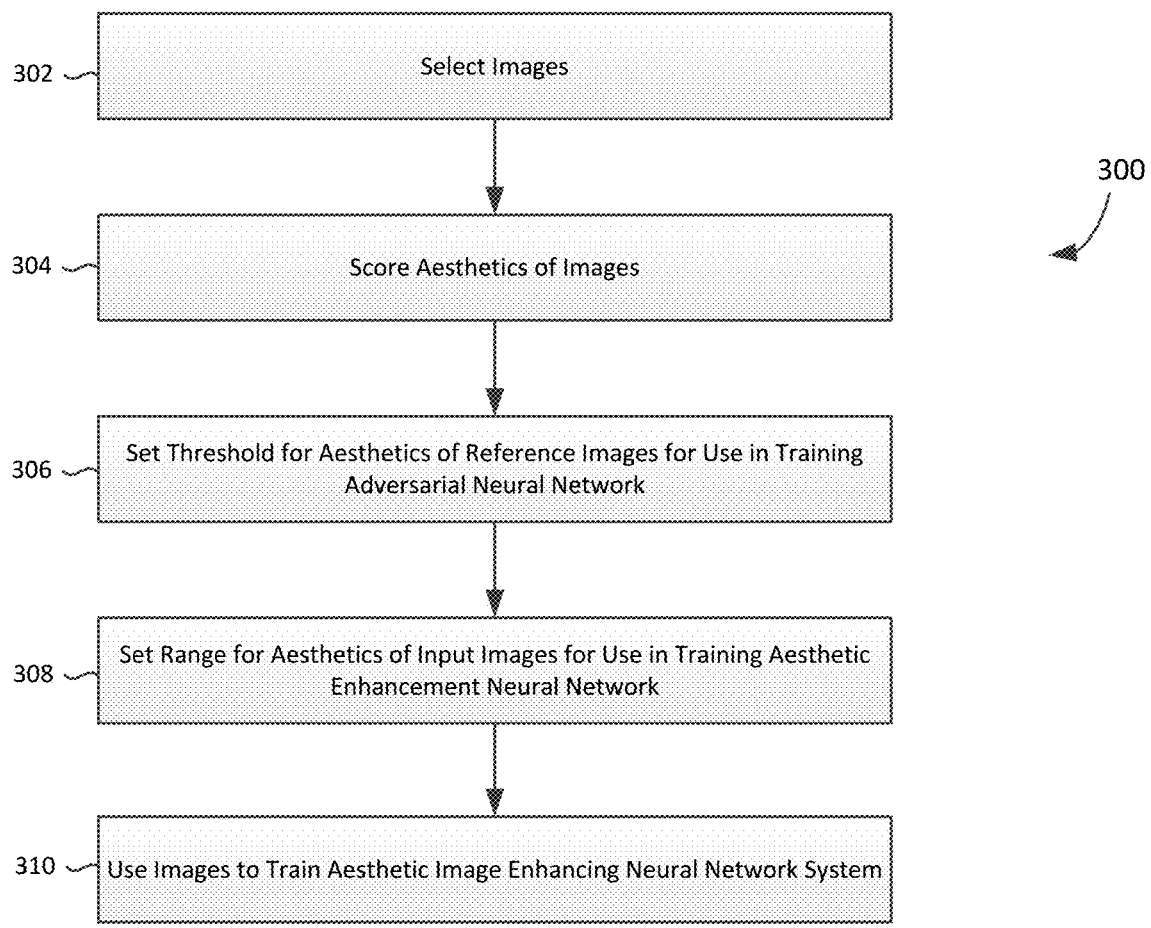
FIG. 3 depicts a process flow showing an embodiment of a method for selecting images for training an aesthetic image enhancing neural network system, in accordance with embodiments of the present disclosure.

With reference to FIG. 3, a process flow is provided showing an embodiment of method 300 for selecting images for training the aesthetic image enhancing neural network system, in accordance with embodiments of the present disclosure. Aspects of method 300 can be performed, for example, by aesthetics scoring engine 210, enhancement engine 214, realism engine 216, and/or training engine 218, as illustrated in FIG. 2.

At block 302, images can be selected for use in training an aesthetic image enhancing neural network system. For example, images can be taken from an online depository (e.g., FLICKR). In other embodiments, a user can input images stored on a local system (e.g., pictures the user has taken).

At block 304, the images can be scored. In an embodiment, scoring can be carried out by evaluating various attributes of the images based on traditional photographic principles including color, lighting, focus, and composition (e.g., interesting content, object emphasis, good lighting, color harmony, vivid color, shallow depth of field, motion blur, rule of thirds, balancing element, repetition, symmetry, etc.). Images can be evaluated using a neural network previously trained to score images based on such attributes, such as an aesthetic attribute prediction network. One manner of scoring can determine an overall aesthetic score for an image. Other manners of scoring can be based on one or more selected attributes used to determine the aesthetic score for an image (e.g., good lighting, rule of thirds, vivid color).

At block 306, a threshold for aesthetics can be set for reference images for use in training an adversarial neural network of an aesthetic image enhancing neural network system. A reference image can be an image previously scored by an aesthetic attribute prediction network designated for training the adversarial neural network. Utilizing a threshold of aesthetic attribute scores can ensure that reference images used to train the adversarial neural network are high enough in quality such that the network learns to distinguish between "real" and "fake" images. "Real" images can be defined as images that are realistic and have a high aesthetic attribute score. "Fake" images can be defined as images that are not realistic and do not have a high aesthetic attribute score. In this way, the adversarial neural network can be trained to indicate whether it perceives a generated image as "real" or "fake" (e.g., whether generated enhanced images produced by the aesthetic enhancement neural network are similar to the reference images with high aesthetic scores).

At block 308, a range of aesthetic scores can be set for input images to use in training an aesthetic enhancement neural network of an aesthetic image enhancing neural network system. An input image can be an image previously scored by an aesthetic attribute prediction network designated for training the aesthetic enhancement neural network. Utilizing a range of aesthetic scores can ensure that the input images used to train the aesthetic enhancement neural network are not too poor in quality (e.g., due to camera shake, blur, image darkness) that the network would have a difficult time learning to enhance the aesthetics but are also not too high in quality that the aesthetic enhancement neural network fails to learn to enhance images.

At block 310, the reference images and input images can be used to respectively train the adversarial neural network and aesthetic enhancement neural network of the aesthetic image enhancing neural network system. Such training of the aesthetic image enhancing neural network system is discussed in more detail below with reference to FIG. 4.

Figure 4:
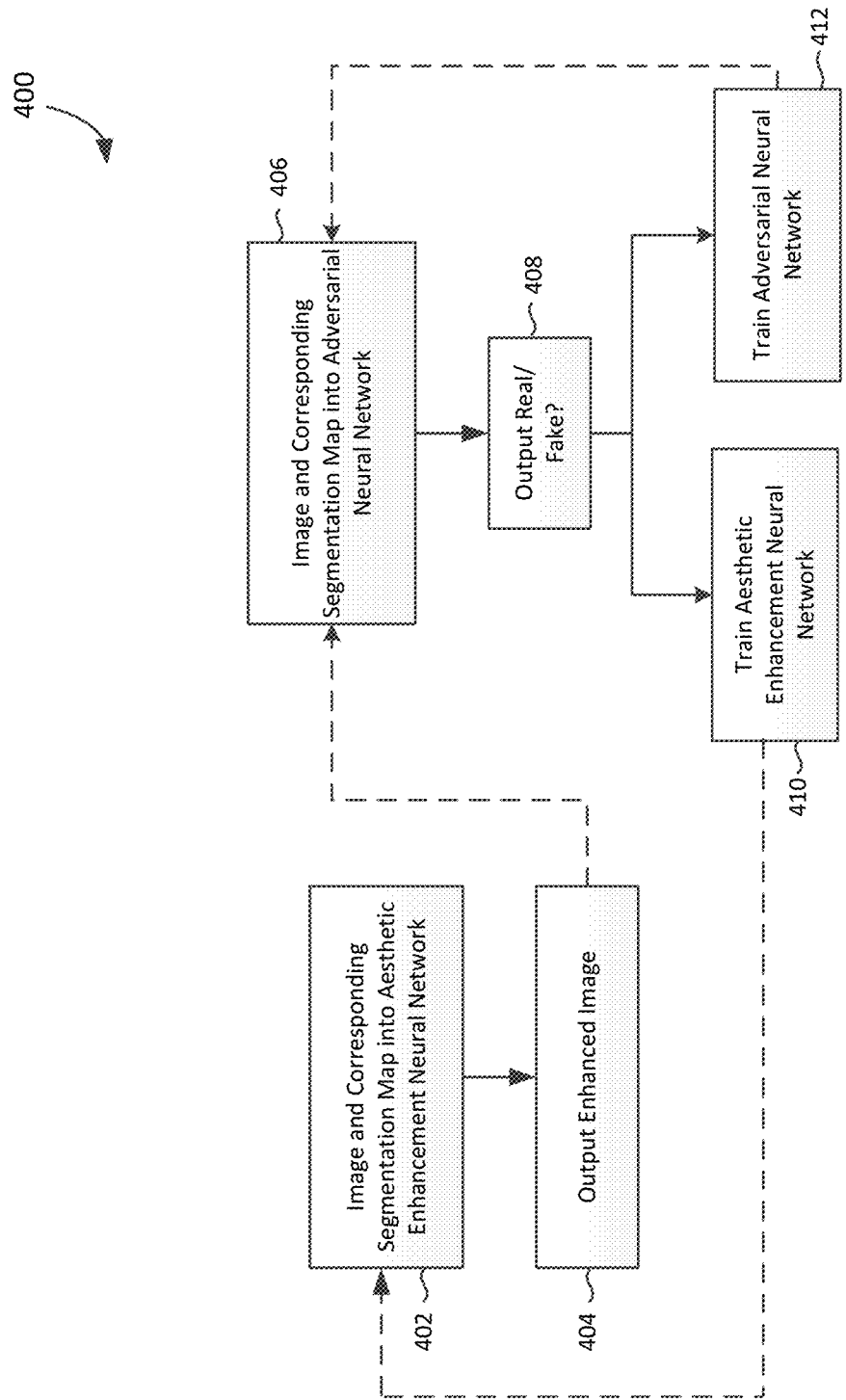
FIG. 4 depicts a process flow showing an embodiments of a method for training and/or utilizing an image aesthetic enhancing neural network system to enhance image aesthetics, in accordance with embodiments of the present disclosure.

With reference to FIG. 4, a process flow is provided showing an embodiment(s) of method 400 for training and/or utilizing an image aesthetic enhancing neural network system to enhance image aesthetics, in accordance with embodiments of the present disclosure. Blocks 402 through 416 include steps for training and/or running an aesthetic enhancement neural network of such a system. Blocks 402 through 422 include steps for training and/or running an adversarial neural network of such a system.

An image aesthetic enhancing neural network system trained and/or used in method 400 can be based on a generative adversarial framework. A generative adversarial framework can comprise a generator, such as an aesthetic enhancement neural network, and a discriminator, such as an adversarial neural network. In this way, the generator portion of the image aesthetic enhancing neural network system can be the aesthetic enhancement neural network that generates enhanced images from an input (e.g., where the input can be an input image and corresponding segmentation map). The discriminator portion of the image aesthetic enhancing neural network system can be the adversarial neural network that evaluates images for realism or authenticity (e.g., the discriminator decides whether an image is "real" or "fake"). While the image aesthetic enhancing neural network system is generally described using two neural networks—the aesthetic enhancement neural network and the adversarial neural network—it should be appreciated that method 400 can be performed using only one neural network and/or additional neural networks.

At block 402, an image can be fed into the aesthetic enhancement neural network along with a segmentation map corresponding to the input image. An image can be selected or received in any manner. For example, such an image can be received and or selected from, for example, data store 202 of FIG. 2 and/or from an image database stored in the cloud. An image can also be received or selected from a device including a camera function (e.g., where the image is picture taken and/or stored on the device).

In embodiments, the image can be an input image. During training of the aesthetic enhancement neural network, input images can be selected based on aesthetic attribute scores. As such, an input image can generally be an image designated for training an aesthetic enhancement neural network based on a predetermined aesthetic score. For example, input images can be images determined to be within a predefined range of aesthetic attribute scores (e.g., 0.3-0.7). Advantageously, utilizing such a range of aesthetic attribute scores can ensure that the images used to train the generator are not too poor in quality such that the neural network system is unable to enhance aesthetics for the image (e.g., due to camera shake, blur, image darkness) but are also not too high in quality that the enhancement neural network will not learn to enhance images (e.g., little to nothing can be enhanced to increase the aesthetics of the image).

In further embodiments, the image can be a user input image. Upon completion of training of the aesthetic enhancement neural network, a selected image can be input into the trained network to generate an enhanced image. As such, a selected image can generally be an image input into a fully trained aesthetic enhancement neural network.

In embodiments, the segmentation map corresponds to the image fed into the aesthetic enhancement neural network. A segmentation map generally refers to a parsed image where image content is mapped for each image pixel (e.g., water, sky, building, etc.). Parsing of an image to generate a segmentation map can be performed using, for example, a pyramid parsing network (e.g., PSPNet).

During training of the aesthetic enhancement neural network, including a segmentation map along with an input image is advantageous because the segmentation map ensures that the network learns to make adaptive adjustments dependent on the categorization/content of an image (e.g., sky is not green, skin is not purple, etc.). As such, training the aesthetic enhancement neural network to be dependent on image content allows for the network to generate and/or understand accurate/real colors during enhancement of an image. Further advantages of training the aesthetic enhancement neural network to recognize the context of portions of an image results in fewer artifacts generated and preservation of accuracy of the image during the enhancement process.

At block 404, an enhanced image can be output by the aesthetic enhancement neural network. Such an enhanced image can have enhanced aesthetics when compared with the input image (e.g., enhancing lighting, increased vivid color, duotone, etc.). When the image aesthetic enhancing neural network system has completed training, such an enhanced image can be the end of method 400. In embodiments, the output enhanced image can be displayed to a user via a graphical user interface on a computing device.

During one iteration of the training process, method 400 can continue to block 406 where an output enhanced image (e.g., the enhanced image output at block 404) can be fed into the adversarial neural network of the image aesthetic enhancing neural network system along with a corresponding segmentation map. An output enhanced image can generally be an enhanced image generated by an aesthetic enhancement neural network that has enhanced aesthetics when compared with an input image fed into the aesthetic enhancement neural network (e.g., enhanced lighting, increased vivid color, duotone, etc.).

At block 408, the adversarial neural network can output an indication whether the image fed into the network is "real" or "fake." "Real" images can be defined as images that are realistic and undistinguishable from images with a high aesthetic attribute score. "Fake" images can be defined as images that are not realistic and are unlikely to be assigned a high aesthetic attribute score. In this way, the adversarial neural network can indicate whether it perceives generated image as "real" or "fake" (e.g., generated enhanced images produced by the aesthetic enhancement neural network).

During iterations where the aesthetic enhancement neural network is undergoing training, the method can progress to block 410 where loss in the network can be determined. Such loss can be determined using a final objective function such as: $L=L_{content}(x_{in}, G(x_{in} \oplus s_{in})) + L_{adversarial}(D(G(x_{in} \oplus s_{in}) \oplus s_{in}), D(x_{ref} \oplus s_{ref}))$. In such a function, L represents loss function used to weight parameters of the system. $L_{content}$ represents content loss. Content loss can be used when the network is trained not to change the content loss of images, just to change the colors. Content loss can be comprised of Euclidean loss and perceptual loss. Euclidean loss can be determined by using the original RGB input image as ground-truth to ensure the generated output remains relatively close to the input image. For instance, Euclidean loss can be calculated pixel-wise the two images. Perceptual loss can be more relaxed compared to Euclidean loss because it compares features. Features can be extracted from the input image using, for example, layers of a pretrained neural network where the layers are represented as color/texture using low level features. Upon extracting features from the input image and generated output image, the features can be compared (e.g., context, texture, edges) such that differences in the features can be treated as loss and used to train the network. As such, content loss is can be used to maintain the content/structure/texture of the original input image in the generated output enhanced image. $L_{adversarial}$ represents adversarial loss. An example formula to calculate adversarial loss is $L_{adversarial}(x, y)=\log(y)+\log(1-x)$ where $x=D(G(x_{in} \oplus s_{in}))$ and $y=D(x_{ref} \oplus s_{ref})$. d.

Incorporating loss functions in the training process means that the aesthetic enhancement neural network can be modified or adjusted based on the quality of generated enhanced images such that each iteration of training increases the success of the network. Such training helps to increase the aesthetics of an image during the enhancement while maintaining the content of the images. For example, in embodiments, the input image, along with the corresponding segmentation map, can be used as ground-truth for training purposes to compare with the output enhanced image, along with the corresponding segmentation map.

During further iterations of the training process, method 400 can begin at block 406 with a reference image fed into an adversarial neural network of an image aesthetic enhancing neural network system along with a corresponding segmentation map. A reference image can generally be defined as an image previously designated for training the adversarial neural network (e.g., based on an aesthetics score by an aesthetic attribute prediction network). Utilizing references images designated based on meeting a threshold of aesthetic attribute score can ensure that reference images used to train the adversarial neural network are high in quality such that the network learns to distinguish between "real" and "fake" images.

At block 408, the adversarial neural network can output an indication whether the image fed into the network is "real" or "fake." "Real" images can be defined as images that are realistic and have a high aesthetic attribute score. "Fake" images can be defined as images that are not realistic and do not have a high aesthetic attribute score. In this way, the adversarial neural network can be trained to indicate whether an image is "real" or "fake."

During iterations where the adversarial neural network is undergoing training, the method can progress to block 412 where the network can be trained based on reference images being designated as "real." As such, training the adversarial neural network can use reference images to help the network learn to designate as "real" images that are similar to the reference images with high aesthetic scores. Utilizing reference images to train the adversarial neural network can allow to network to determine whether generated output enhanced images differ from real images (e.g., images with high aesthetics that are not generated by the neural network system).

In this way, the aesthetic enhancement neural network and adversarial neural network of the image aesthetic enhancing neural network system can be updated alternatively during training. For instance, when training to update the aesthetic enhancement neural network, blocks 402 to 410 can be performed, whereas when training to update the adversarial neural network, blocks 406, 408, and 412 can be performed. It should be appreciated that in some embodiments, the adversarial neural network can undergo some or all training prior to the training of the aesthetic enhancement neural network (such that the adversarial neural network can identify "real" or "fake" images). In further embodiments, the adversarial neural network can be trained to assign "real" or "fake" to images based in part on an aesthetic score of an image (e.g., images that are similar to training images with scores over 0.95 are "real").

Iterations of training the networks comprising the image aesthetic enhancing neural network system can be repeated for a sufficiently large number of training cycles, until the neural network system converges to a state where errors fall below a predetermined threshold such that the output produced reaches a desired threshold minimum of loss between input images and output images. Further, training can continue until the adversarial neural network can no longer distinguish generated output images from reference images (e.g., images with high aesthetics that are not generated by the neural network system).

Upon completion of training, blocks 406 to 410 can be removed from method 400. The adversarial neural network can be used during training to ensure that the generated output enhanced images are enhanced enough to be similar to reference images (e.g., if the enhanced images received an aesthetic score, the score would be high, such as above 0.7). In this manner, during training, the adversarial neural network can output a binary evaluation of an image designating the perceived realism of the image, where one is a "real" image—likely to have a high aesthetics score—and zero is a "fake" image—likely to have an aesthetic score below the threshold used to select references images. As such, the adversarial neural network ensures that the aesthetic enhancement neural network generates images that meet the goal of the trained network, generating enhanced images that have enhanced aesthetics. One manner in which enhanced aesthetics can be measured is that the enhanced image would have a high aesthetics score compared to that of an image fed into the aesthetic enhancement neural network.

Figure 5:
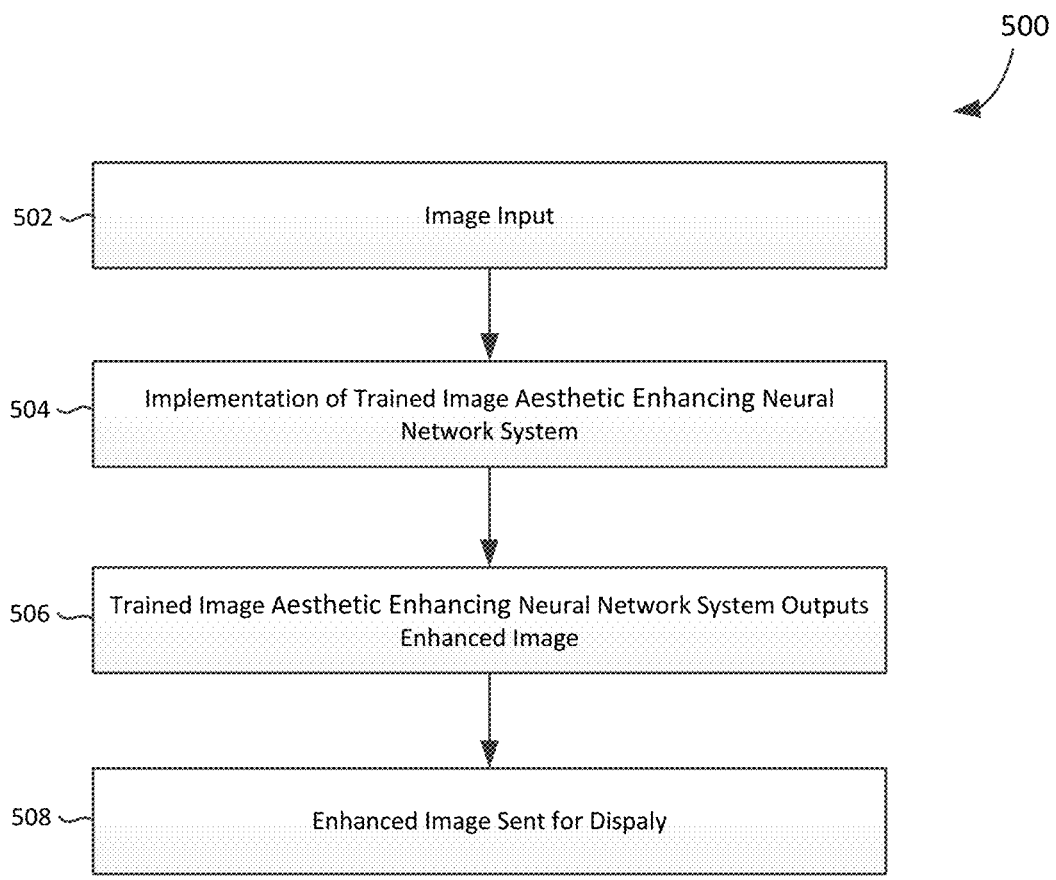
FIG. 5 depicts a process flow showing an embodiment of a method for using a trained image aesthetic enhancing neural network system to enhance the aesthetics of an image, in accordance with embodiments of the present disclosure.

With reference to FIG. 5, a process flow is provided showing an embodiment of method 500 for using a trained image aesthetic enhancing neural network system to enhance the aesthetics of an image, in accordance with embodiments of the present disclosure.

At block 502, an image can be input. Such an image can be selected for input from a data store, from an image database stored in the cloud, and/or from a user device. In particular, a user can select an image to input into the trained network. An image can be selected or input in any manner. For example, a user may take a picture using a camera function on a device. As another example, a user may select a desired image from a repository, for example, stored in a data store accessible by a network or stored locally at a user device.

Upon inputting an image, a corresponding segmentation map can be obtained and/or generated for the image. A segmentation map can be generated using, for example a network trained to parse images (e.g., a pyramid parsing network, such as PSPNet). A generated segmentation map can be coded using 8 bit grayscale mapping to designate various categories for the images pixels. In other embodiments, a predetermined segmentation map may be input along with the image.

At block 504, the received image can be fed into a trained image aesthetic enhancing neural network system along with a corresponding segmentation map. The trained image aesthetic enhancing neural network system applies its learned weights to the image to enhance the received image and, at block 506, the system can output an enhanced image. This can be accomplished, for example, by using a U-Net encoder-decoder with skip connections between mirrored layers in the encoder and decoder stack to downsample the received image to a lower dimension, performing a sequence of transformations using the weighted network connections to generate an enhanced image, and then upsampling the enhanced image to a desired output size.

At block 508, the enhanced image can be sent, for example, to a user device, for display. Such an image can be displayed using a graphical user interface on a user device. For example, an image can be submitted by a user into an application on a user device, and upon generation of an enhanced image, the image can be displayed to the user via the device.

Figure 6:
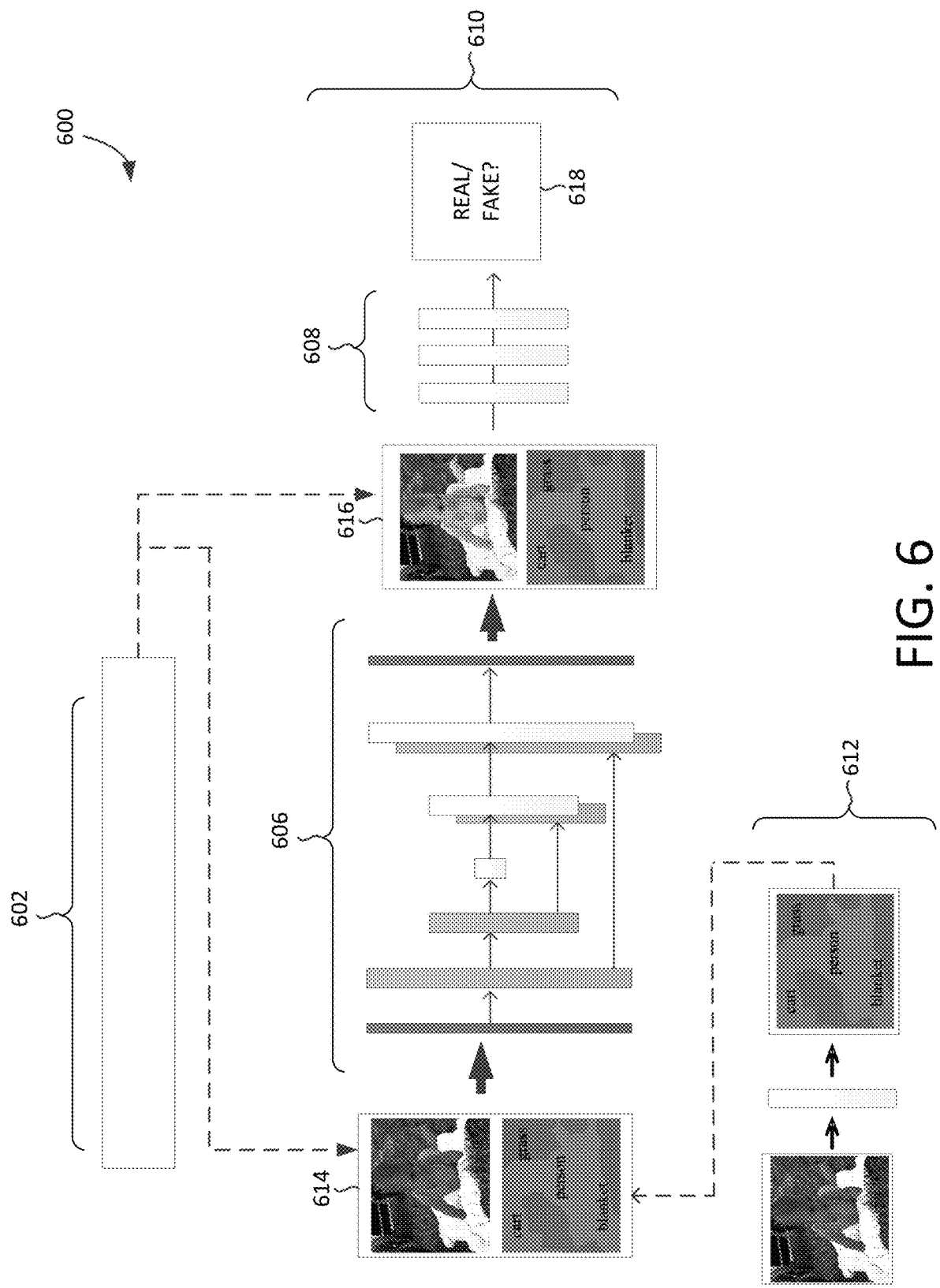
FIG. 6 illustrates an example environment that can be used for training an image aesthetic enhancing neural network system to enhance images, in accordance with embodiments of the present disclosure.

FIG. 6 illustrates an example environment 600 that can be used for training image aesthetic enhancing neural network system 610 to enhance images, in accordance with embodiments of the present disclosure. The image aesthetic enhancing neural network system can comprise aesthetic enhancement neural network 606 and adversarial neural network 608. Training an image aesthetic enhancing neural network system can be performed using, for example, the aesthetic enhancement neural network and adversarial neural network. Additional networks can also aid in the training of the image aesthetic enhancing neural network system such as aesthetic scoring network 602 and segmentation network 612.

Input 614 can be fed into aesthetic enhancement neural network 606. Such an input can include, for example, an image and a corresponding segmentation map. In embodiments, upon an indication that an image is selected to be fed into aesthetic enhancement neural network, a corresponding segmentation map can be generated and/or obtained for the image. For example, segmentation network 612 can be used to generate a segmentation map for the image. As depicted, the segmentation network maps portions of an image into various categories (e.g., cart, person, grass, blanket, etc.). In other embodiments, a predetermined segmentation map can be input along with the image.

In embodiments, the image in input 614 can be an input image for training the aesthetic enhancement neural network of image aesthetic enhancing neural network system 610. Such an input image used to train the aesthetic enhancement neural network can be selected based on aesthetic score. In an embodiment, images can be selected that are determined to be within a predefined range of aesthetic attribute scores (e.g., 0.3-0.7). Utilizing such a range of aesthetic attribute scores can ensure that the images used to train the generator are not poor in quality such that the neural network system is unable to enhance aesthetics for the image (e.g., due to camera shake, blur, image darkness) but are also not too high in quality that the enhancement neural network will not learn to enhance images.

Aesthetic scoring network 602 can be used to score aesthetics of images. Such images can be taken from a large dataset of image (e.g., FLCKR). To score the aesthetics of an image, various methods can be utilized. One method of scoring estimates an overall aesthetic score for an image using a neural network trained to analyze attributes of an image and output an aesthetic score. During training of the aesthetic enhancement neural network, input images can be selected using a range of aesthetic attribute scores (e.g., 0.3-0.7). Utilizing such a range of aesthetic attribute scores can ensure that the training images are not too poor in quality (e.g., due to camera shake, blur, image darkness) but are also not too high in quality that the enhancement neural network will not learn to enhance images.

An input image can be fed into aesthetic enhancement neural network. As depicted, such a network can use a U-Net encoder-decoder architecture with skip connections between mirrored layers in the encoder and decoder stack to downsample the input image to a lower dimension, performing a sequence of transformations on the input image to generate an enhanced image, and then upsampling the enhanced image to a desired output size. Using such a network, an enhanced image can be output (e.g., the image in 616).

In embodiments, the image in 616 can be an output generated image from aesthetic enhancement neural network 606. In further embodiments, the image in 616 can be a reference image. A reference image can be an image previously scored by an aesthetic attribute prediction network designated for training the adversarial neural network (e.g., having a score about 0.9). Utilizing a threshold of aesthetic attribute scores can ensure that reference images used to train the adversarial neural network are high in quality such that the network learns to distinguish between "real" and "fake" images. "Real" images can be defined as images that are realistic and have a high aesthetic attribute score. "Fake" images can be defined as images that are not realistic and do not have a high aesthetic attribute score.

In embodiments, an image and segmentation map in 616 can be fed into adversarial neural network 608. The adversarial neural network can output an indication of whether the image fed into the network is "real" or "fake." In this way, the adversarial neural network can indicate whether it perceives generated image as "real" or "fake" 618 (e.g., generated enhanced images produced by the aesthetic enhancement neural network).

During iterations in which the aesthetic enhancement neural network is undergoing training, the loss in the network can be determined and fed back though the network to decrease the loss in further iterations. Iterations of training can be repeated for a sufficiently large number of training cycles, until the neural network system converges to a desired state (e.g., where errors fall below a predetermined threshold such that the output produced reaches a desired threshold minimum of loss between input images and output images and/or until the adversarial neural network can no longer distinguish generated output images as "fake").

Figure 7:
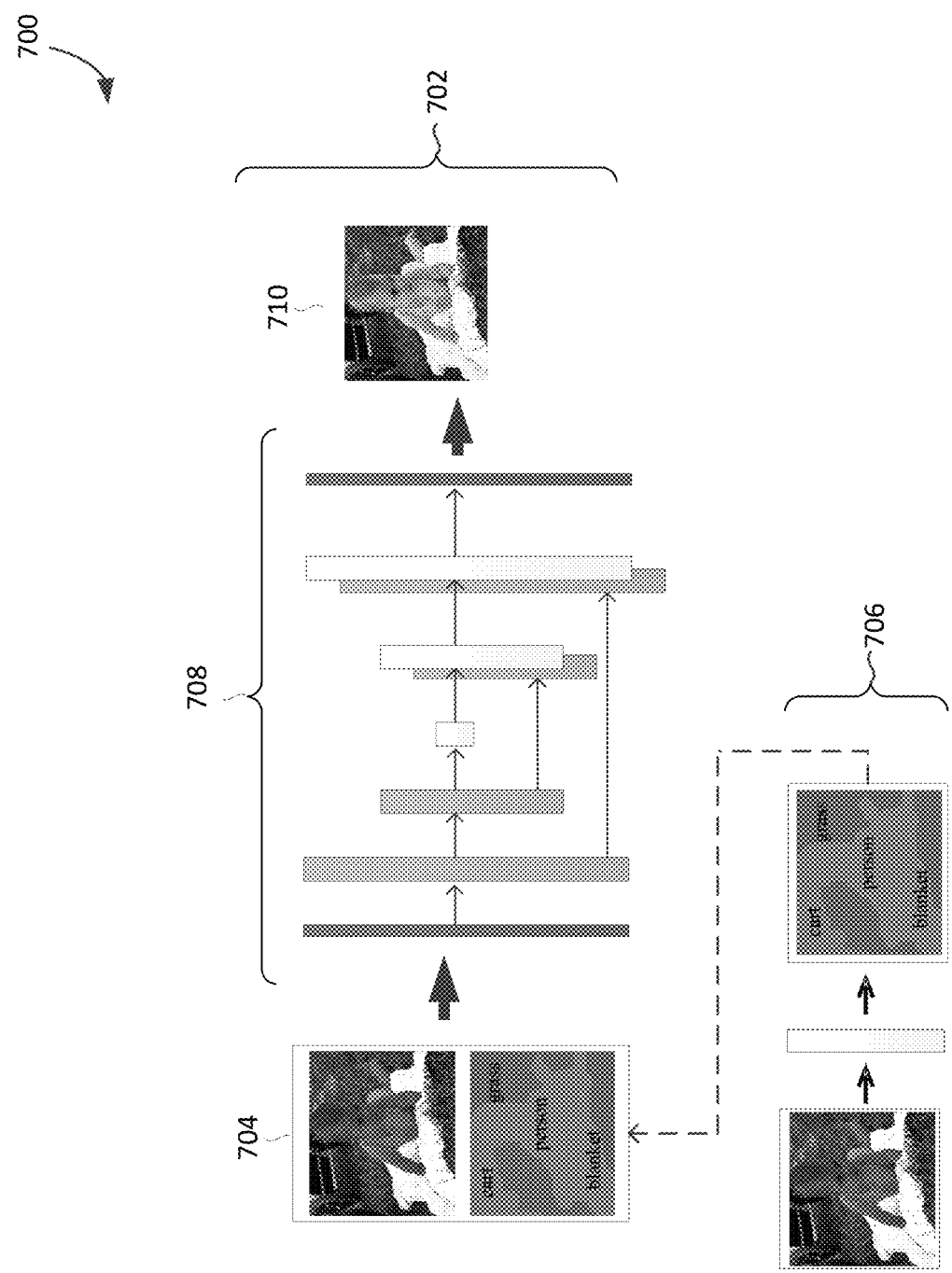
FIG. 7 illustrates an example environment that can be used for running a trained image aesthetic enhancing neural network system to enhance images, in accordance with embodiments of the present disclosure.

FIG. 7 illustrates an example environment 700 that can be used for running a trained image aesthetic enhancing neural network system 702 to enhance images, in accordance with embodiments of the present disclosure. A trained image aesthetic enhancing neural network system can be comprised of aesthetic enhancement neural network 708. Additional networks can also aid in the running of the image aesthetic enhancing neural network system such as segmentation network 706.

Input 704 can be fed into the trained image aesthetic enhancing neural network system. Such an input can include, for example, an image and a corresponding segmentation map. In embodiments, upon an indication that an image is selected to be fed into aesthetic enhancement neural network, a corresponding segmentation map can be generated and/or obtained for the image. For example, segmentation network 706 can be used to generate a segmentation map for the image. As depicted, the segmentation network maps portions of an image into various categories (e.g., cart, person, grass, blanket, etc.). In other embodiments, a predetermined segmentation map can be input along with the image.

In embodiments, the image in input 704 can be a selected image. Such an image can be selected for input from a data store, from an image database stored in the cloud, and/or from a user device. In particular, a user can select an image to input into the trained network. An image can be selected or input in any manner. For example, a user may take a picture using a camera function on a device. As another example, a user may select a desired image from a repository, for example, stored in a data store accessible by a network or stored locally at a user device.

In embodiments, output 710 can be generated by the trained image aesthetic enhancing neural network system by applying learned weights. For instance, an output (e.g., enhanced image) can be generated using a U-Net encoder-decoder with skip connections between mirrored layers in the encoder and decoder stack to downsample the image to a lower dimension, performing a sequence of transformations using the weighted network connections, to generate an enhanced image, and then upsampling the enhanced image to a desired output size. Output 710 can be a generated enhanced image based on the image in input 704.

Image aesthetic enhancing neural network system 702 can previously have been trained in a manner as described, for example, with reference to method 400 in FIG. 4. As such, the image aesthetic enhancing neural network system can be comprised of a first neural network, such as an image enhancement neural network, trained to generate enhance images conditioned by a corresponding segmentation map and a second neural network such as an adversarial neural network, trained to discriminate generated enhanced images from reference images (e.g., images designated as "real").

Figure 8:
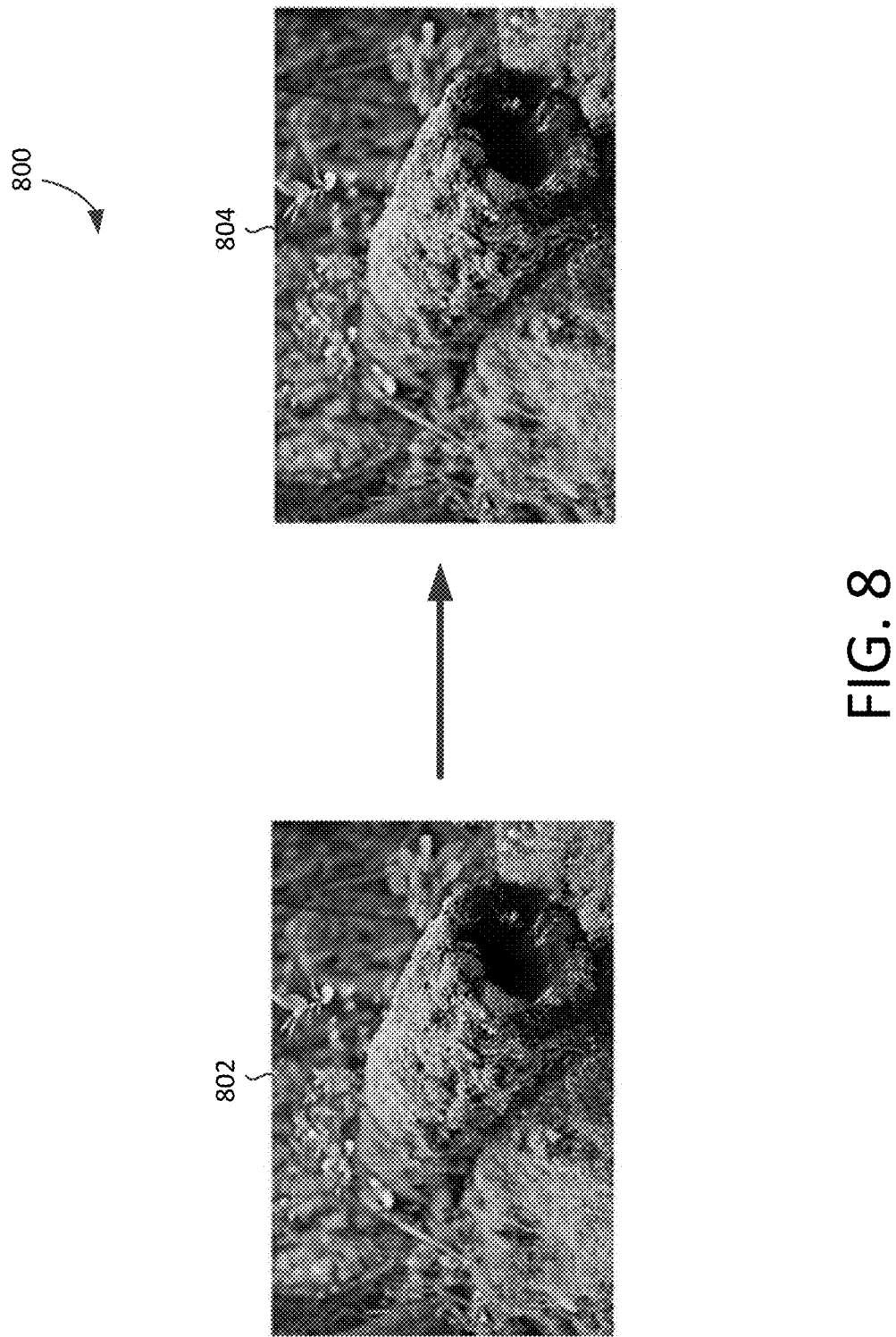
FIG. 8 illustrates an example transformation using a trained image aesthetic enhancing neural network system to enhance an image, in accordance with embodiments of the present disclosure.

FIG. 8 illustrates an example transformation 800 using a trained image aesthetic enhancing neural network system to enhance an image, in accordance with embodiments of the present disclosure. Image 802 can be input into a trained image aesthetic enhancing neural network system, for example, a U-Net encoder-decoder with skip connections between mirrored layers in the encoder and decoder stack. Such a system can downsample the image to a lower dimension, perform a sequence of transformations using weighted network connections, generate an enhanced image, and then upsample the enhanced image to a desired output size. This process can result in output 804. Output 804 can be an enhanced image with enhanced aesthetics when compared with the input image (e.g., enhancing lighting, increased vivid color, duotone, etc.).

Figure 9:
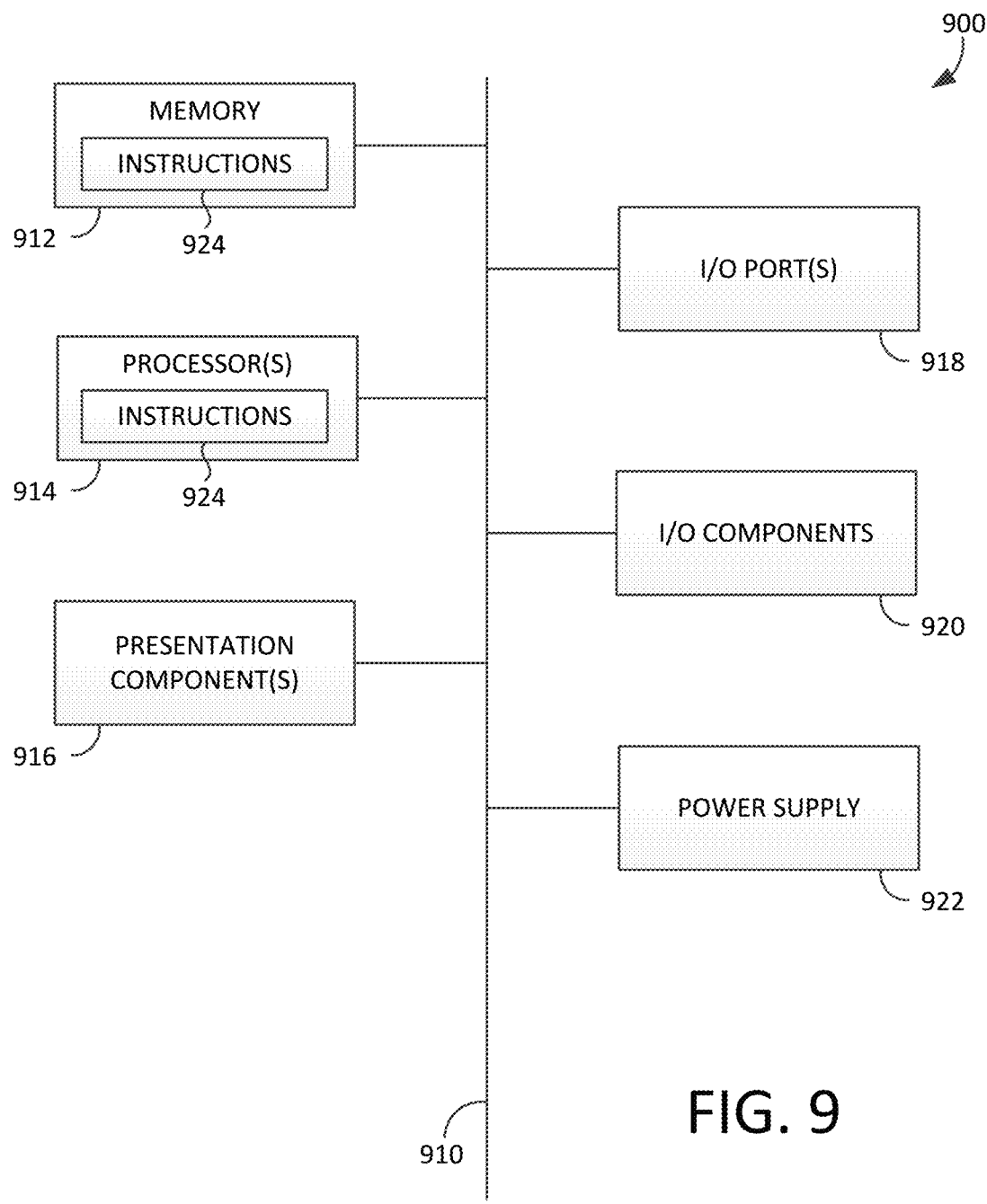
FIG. 9 is a block diagram of an example computing device in which embodiments of the present disclosure may be employed.

With reference to FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 9 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 900. Computing device 900 may be equipped with depth cameras, such as stereoscopic camera systems, infrared camera systems, RGB camera systems, and combinations of these, for gesture detection and recognition. Additionally, computing device 900 may be equipped with accelerometers or gyroscopes that enable detection of motion. The output of the accelerometers or gyroscopes may be provided to the display of computing device 900 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. One or more non-transitory computer-readable media having a plurality of executable instructions embodied thereon, which, when executed by one or more processors, cause the one or more processors to perform a method, the method comprising:
   obtaining scored images, wherein a plurality of images are scored based on aesthetic attributes;
   designating the scored images that have aesthetic scores within a predefined range as input images;
   designating the scored images that have aesthetic scores above a predefined threshold as reference images;
   training an aesthetic image enhancing neural network system using the input images with a first neural network and reference images with a second neural network, wherein the trained aesthetic image enhancing neural network system is used to generate an enhanced image from an image input;
   analyzing portions of the scored images using a segmentation network, wherein analyzing portions of the scored images using the segmentation network causes adaptive adjustments by the first neural network; and
   outputting the enhanced image, wherein the enhanced image has increased aesthetics when compared with the image input into the trained aesthetic image enhancing neural network system.

2. The non-transitory media of claim 1, wherein the adaptive adjustments by the first neural network are dependent on the content of the scored images.

3. The non-transitory media of claim 1, wherein the aesthetic scores are assigned based on one or more aesthetic attribute.

4. The non-transitory media of claim 3, wherein the one or more aesthetic attributes include one or more of interesting content, object emphasis, lighting, color harmony, vivid color, shallow depth of field, motion blur, rule of thirds, balancing element, repetition, and symmetry.

5. The non-transitory media of claim 1, wherein training the aesthetic image enhancing neural network system further comprises:
   during a first iteration, determining loss using a comparison between a training enhanced image and an input image based in part on differences conditioned on a corresponding segmentation map; and
   adjusting the aesthetic image enhancing neural network system based on the determined loss.

6. The non-transitory media of claim 5, wherein the loss is one or more of content loss and adversarial loss.

7. The non-transitory media of claim 1, wherein training the aesthetic image enhancing neural network system further comprises:
   during a first iteration, determining loss using a comparison between a reference image and realism designation; and
   adjusting the aesthetic image enhancing neural network system based on the determined loss.

8. The non-transitory media of claim 7, wherein the loss is one or more of content loss and adversarial loss.

9. A computing system comprising:
   one or more processors; and
   one or more non-transitory computer-readable storage media, coupled with the one or more processors, having instructions stored thereon, which, when executed by the one or more processors, cause the computing system to:
   obtain a set of images for training a first neural network of an aesthetic image enhancing neural network system;
   determine a plurality of aesthetic scores for the set of images;
   analyze portions of the scored images using a segmentation network, thereby causing adaptive adjustments by the first neural network;
   designate a subset of the set of images, having aesthetic scores above a threshold level, as reference images for training a second neural network of the aesthetic image enhancing neural network system; and
   train the aesthetic image enhancing neural network system using the set of images and the reference images, wherein the trained aesthetic image enhancing neural network system generates an enhanced image from a first input image.

10. The computing system of claim 9, further comprising:
   obtain a parsed image corresponding to the first input image; and
   input the parsed image into the trained aesthetic image enhancing neural network system, wherein the first neural network converts the first input image into the enhanced aesthetic image using the parsed image.

11. The computing system of claim 9, wherein the first neural network acts as a generator in the trained aesthetic image enhancing neural network system based on a generative adversarial type architecture.

12. The computing system of claim 9, wherein the trained aesthetic image enhancing neural network system further includes a deactivated second neural network that acts as a discriminator during training.

13. The computing system of claim 9, wherein the first input image is selected from a set of images stored on a user device, the set of images taken using a camera function of the user device.

14. The computing system of claim 9, wherein the first neural network parses the set of images using a pyramid parsing network.

15. The computing system of claim 9, wherein the first neural network parses the set of images using grayscale.

* * * * *